UNITED STATES PATENT OFFICE.

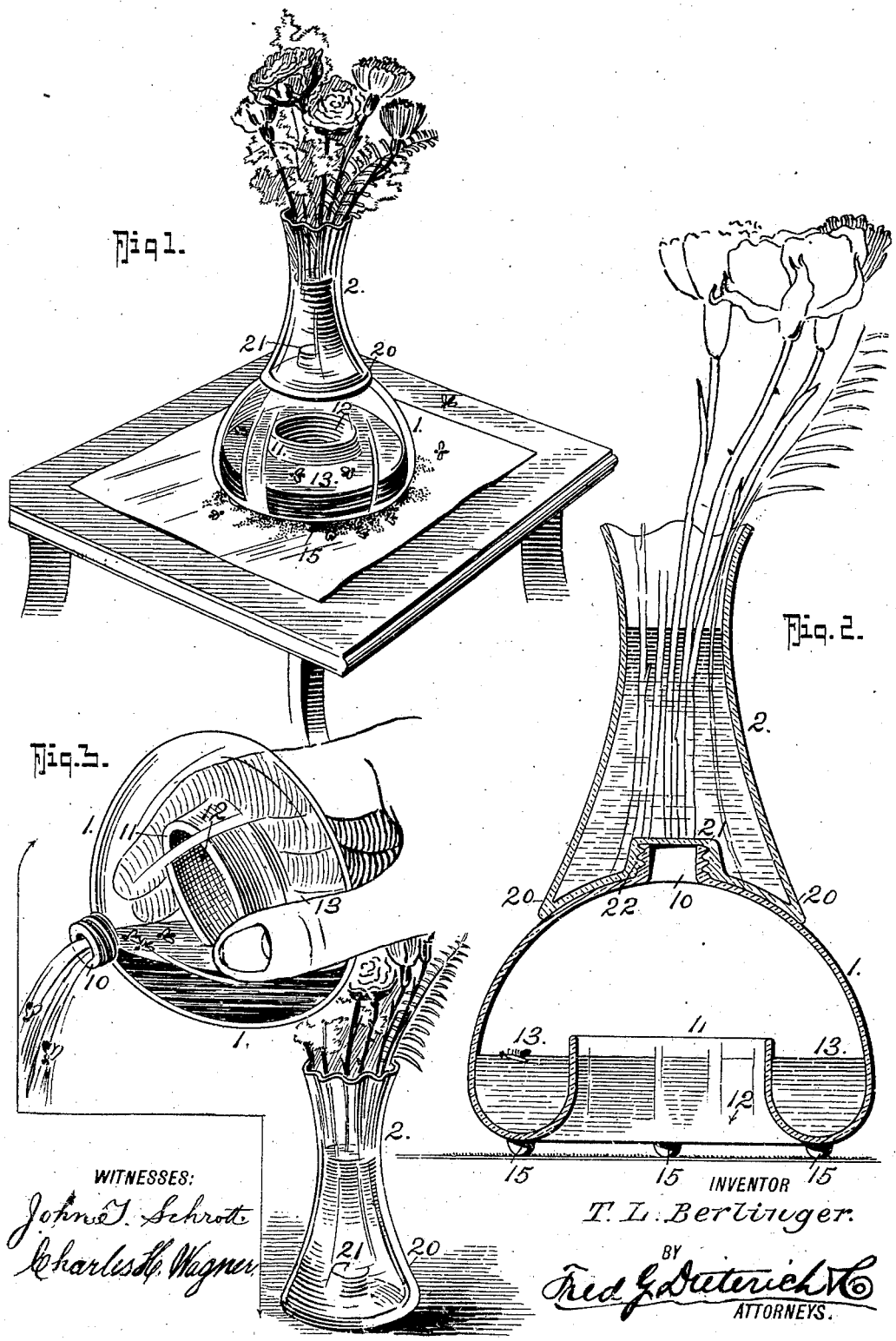

THEODORE L. BERLINGER, OF SOLDIERS HOME, CALIFORNIA.

FLOWER-HOLDER AND INSECT-TRAP.

972,092. Specification of Letters Patent. Patented Oct. 4, 1910.

Application filed February 28, 1910. Serial No. 546,457.

*To all whom it may concern:*

Be it known that I, THEODORE L. BERLINGER, residing at Solders Home, in the county of Los Angeles and State of California, have invented a new and Improved Flower-Holder and Insect-Trap, of which the following is a specification.

This invention relates to improvements in that class of appliances, of ornamental design and adapted for setting on a table or mantle-piece that serve as a vase for holding flowers and as a means for trapping flies or other insects, and my said invention has for its object to provide a simple and inexpensive appliance of the general type stated, and especially designed for the double use stated and the parts so arranged whereby the operation of cleaning out the trap is expeditiously and conveniently provided for, without necessitating the removal of the flowers from the flower receiving portion.

My invention comprehends an appliance of the character stated, that embodies the peculiar arrangement and combination of parts, all of which will be hereinafter explained, specifically pointed out in the appended claim and illustrated in the accompanying drawing, in which:—

Figure 1, is a perspective view that illustrates my invention as in use. Fig. 2, is a vertical section thereof. Fig. 3, illustrates the manner in which the trap portion is cleared of insects and the manner in which the flower holder portion is supported when removed from the trap.

In the practical arrangement of my invention, the same embodies a base or trap portion 1 and an upper or flower holder 2, both preferably formed of glass. The base 1 is bell shaped and at the center of its dome portion it has a vertically extended tubular neck 10 that is externally threaded to receive the holder 2, presently again referred to. The bottom of the member 1 is bent inwardly to form an internal annular flange 11 that surrounds a large central opening 12 and provides an annular trough 13 which, in practice, is filled with water or other insect killing liquid, and which is poured into the trap through the neck 10. To hold the bottom of trap 1 from the table it has a number of pendent projections 15, as clearly shown in the drawing.

The flower holder or vase 2 may have its walls of any desired or ornamental shape but the base thereof is widened and is concaved as at 20 to form a wide seat for snugly engaging the dome portion of the trap, when the two parts are joined and to provide for the said parts firmly engaging each other the bottom 20 has a central upwardly extended boss 21 having a threaded socket 22 whereby it can be screwed down onto and held in locked engagement with the base or trap portion. Another advantage in making the holder with a wide concaved base is that when removed from the trap during the operation of cleaning, see Fig. 3, said base forms a solid stand for the vase or flower holder and protects it from being easily tipped over.

In the use of my invention, the vase portion can be readily detached and thereby filled with flowers and water without the necessity of handling the trap portion, further than to hold it down while the vase part is threaded off. This is advantageous, since it avoids danger of spilling the contents of the bottom as is likely to occur in the promiscuous handling of the vase with the bottom attached. In setting my device on the table it is placed on a paper on which is spread some insect attracting substance, such as sugar, and since the flies that are attracted fly upwardly through the opening in the bottom of the member 1, in striking the inner side of the dome portion of part 1 they fall back into the dome and are killed by the liquid. When it is desired to remove the dead flies, the base section 2 is lifted off the base 1 and set to one side, as shown in Fig. 3 and the bottom is cleared by pouring the liquid with the flies out through the neck 10, as shown.

Having thus described my invention, what I claim is:

An appliance for the purposes described, comprising a dome-shaped receptacle having a central bottom opening and the wall of which projects upwardly and inwardly whereby to form an annular internal liquid holding trough, the bottom of the receptacle having pendent projections, the dome portion having a centrally projected tubular and threaded neck, and a holder having an annularly enlarged base concaved to snugly rest on the top of the dome-shaped receptacle, said concaved base having a centrally disposed hub formed with an internally threaded socket to engage the threaded neck of the dome.

THEODORE L. BERLINGER.

Witnesses:
J. S. BYRNE,
J. H. DEMAREST.